W. F. JENKINS.
AUTOMOBILE LOCK.
APPLICATION FILED JULY 15, 1919.
1,376,885.
Patented May 3, 1921.
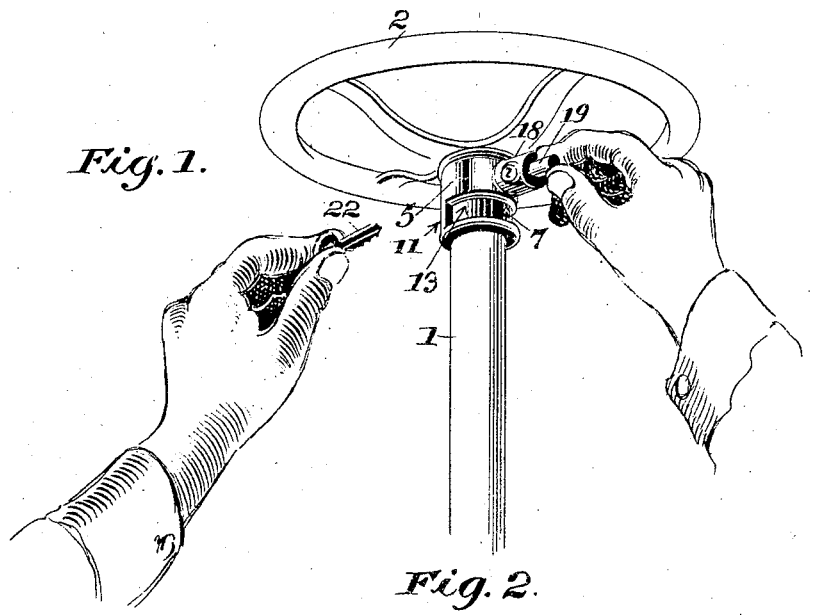
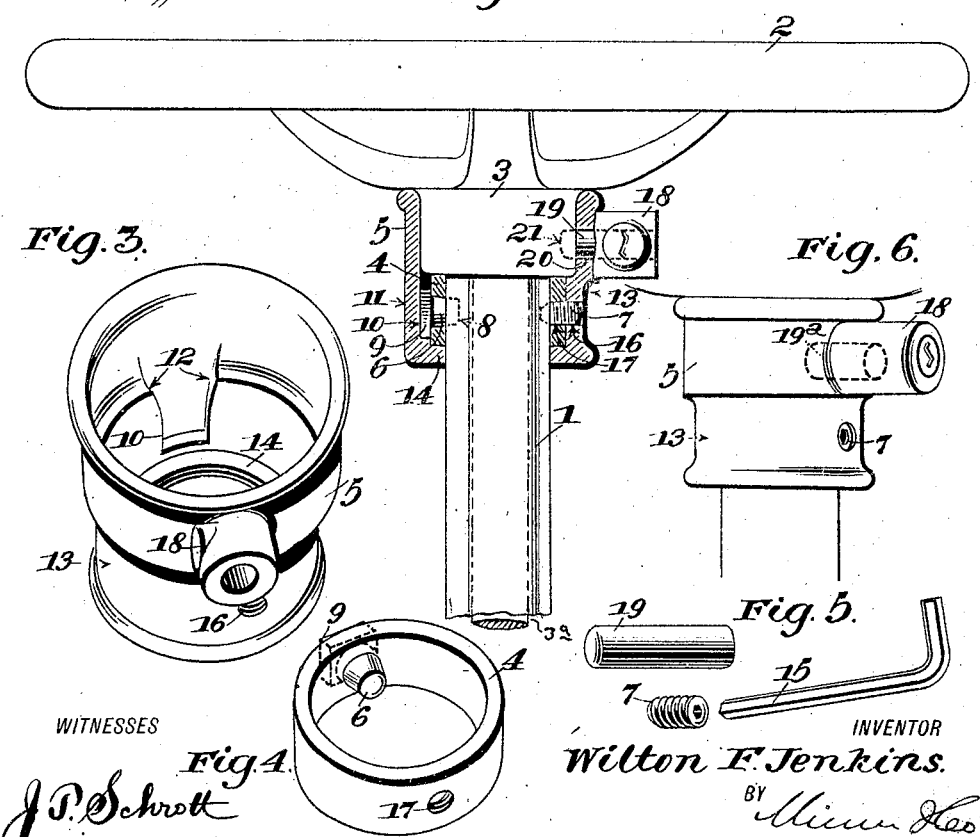

UNITED STATES PATENT OFFICE.

WILTON F. JENKINS, OF RICHMOND, VIRGINIA.

AUTOMOBILE-LOCK.

1,376,885.      Specification of Letters Patent.      Patented May 3, 1921.

Application filed July 15, 1919. Serial No. 311,001.

*To all whom it may concern:*

Be it known that I, WILTON F. JENKINS, a citizen of the United States, and a resident of Richmond, in the county of Henrico and State of Virginia, have invented certain new and useful Improvements in Automobile-Locks, of which the following is a specification.

My invention relates to improvements in automobile locks, and it consists in the constructions, combinations and arrangements herein described and claimed.

One of the foremost objects of my invention is to provide a simple and durable automobile lock to be operatively associated with the steering wheel and post of an automobile.

A further object of the invention is to provide an automobile lock of such construction and material that it cannot be broken without great difficulty, thereby discouraging unauthorized removals of the automobile.

Other objects and advantages will appear in the following specification, reference being had to the accompanying drawing in which:

Figure 1 is a perspective view showing the automobile lock applied, also illustrating the manner of inserting the bolt and key, Fig. 2 is a detail sectional view showing the improved lock applied to the fixed column, Fig. 3 is a detail perspective view of the fixed lock sleeve, Fig. 4 is a detail perspective view of the fixed lock collar, Fig. 5 is a detail assembly perspective view showing various minor parts of the lock, and Fig. 6 is a perspective view of the lock showing a slight modification of the arrangement of the locking casing.

That portion of the steering mechanism of an automobile to which this particular lock is applied, ordinarily comprises the fixed column 1, the steering wheel 2 and a hub-like structure 3, which is a part of the steering wheel, and which is carried by the steering shaft 3ª. Applied to the fixed column 1 and abutting the hub 3, is the lock collar 4.

This lock collar and the lock sleeve 5 constitute the major parts of the improved automobile lock. The collar 4 is permanently fixed in place by means of a lock stud 6 at one side and a threaded plug 7 at the other. The stud 6 is concealed from view but the plug 7 is accessible from the outside.

A slight taper of the stud 6 enables the stud to be firmly driven or wedged into the opening 8 at the corresponding side of the fixed column 1. The stud 6 has a non-circular head 9 which occupies the neatly formed recess 10 in the thickened side portion 11 of the lock sleeve 5.

Beveled portions 12 of the side walls of the recess 10 enable the easy finding of the recess when the lock sleeve 5 is slipped upwardly on the fixed column 1 in locating the lock sleeve in its final position with respect to the lock bar 4 and the hub 3. The sleeve 5 is reduced at 13, with the exception of the thickened portion 11, the reduction 13 having an internal flange 14 which forms an annular shoulder to be engaged by the collar 4.

The threaded plug 7 is screwed in by means of the wrench 15, until its set-point is deeply buried into the side of the fixed column 1. For the purposes of the plug the lock sleeve and collar have alining threaded apertures 16—17. Unless a person has a wrench exactly made to order, it is impossible, or nearly so, to remove the plug 7. That is the reason that it is of no consequence that the plug is accessible from the outside. After the plug is once firmly screwed in place, considerable force is required to remove it. It therefore follows that if the point of the wrench is too hard, the wrench will snap, conversely if it is too soft, it will crumble in the hexagonal hole.

A locking casing 18 is suitably affixed to the side of the lock sleeve 5. This casing contains a suitable lock of any type, for the purpose of locking the bolt 19 in position in the alining apertures 20, 21 in the sleeve 5 and hub 3 respectively. Fig. 1 shows how the bolt 19 is taken in the fingers of one hand in the act of feeling for the locking aperture 21. The operator takes the steering wheel and turns it from side to side at the same time pressing the bolt 19 inwardly, until he finds the locking aperture. If desired, a plurality of locking apertures 21 may be provided, so that the front wheels can be locked at an angle instead of straight to the front.

Instead of arranging the locking casing so as to be locked by the key 22 from the side, it may be arranged as in Fig. 6, wherein the mechanism for locking the bolt 19ª is such as to be operated from the end. It is desired to specify no particular type of lock because it is expected to have recourse to some suitable one of the many existing types.

The advantages of the improved automobile lock will be apparent at once. Primarily, the lock is simple. The lock sleeve 5 is to be made of such material, as for example case hardened steel, that cannot be cut into. The relative smallness of the lock and its secluded position beneath the steering wheel tend to discourage efforts to break the lock by unauthorized persons.

The lock collar 4 is fixed in place first. Then the lock sleeve 5 is slipped up and secured by the plug 7. Both the sleeve and collar are immovable, but of course the hub 3 is revoluble inside of the upper cup portion of the lock sleeve.

While the construction and arrangement of the improved automobile lock as herein described and claimed is that of a generally preferred form, obviously modifications and changes can be made without departing from the spirit of the invention or the scope of the claims.

I claim:

1. An automobile lock, comprising a collar to be applied to a fixed column, said column housing a steering shaft, a sleeve, with a recess, concealing the collar; securing means carried by the collar, entering the column and including a portion fitting in the recess; other securing means including a threaded stud passing through the sleeve and collar into the column, having an accessible head with a non-circular opening to receive a specially formed wrench, a locking bolt to engage a part of the steering shaft, and a key-lock carried by the sleeve, for securing said bolt when in proper shaft-engagement.

2. The combination of a fixed column and a revoluble steering wheel with a hub, an automobile lock operatively associated with the aforesaid parts, comprising a lock collar, means for fixing the collar on the column and including an exposed engageable part, a cup-shaped lock sleeve receiving and concealing the lock collar and said engageable part thereby preventing turning, and receiving the revoluble hub; means for securing the sleeve, collar and column together, and a locking bolt and casing operatively associated with the lock sleeve to coöperate with a locking aperture in the revoluble hub.

3. An automobile lock, comprising a collar, securing means including a tapering stud with a non-circular head, by which the collar is secured to a fixed column; a cup-shaped lock sleeve, with a thickened portion having a beveled-sided recess for said head, and a bottom flange abutting the collar; exteriorly accessible common securing means for the sleeve, collar and column, a locking bolt capable of manipulation by the fingers to find a locking aperture in the revoluble hub of an associated steering wheel, and a suitable lock mounted on the sleeve for binding said bolt in the locking position.

WILTON F. JENKINS.